Feb. 14, 1967 J. S. HICKMAN ETAL 3,303,688
TRANSDUCER TEST EQUIPMENT AND METHOD
Filed March 9, 1965 2 Sheets-Sheet 1

INVENTORS
JOHN S. HICKMAN
BY GORDON E. MARTIN
ATTORNEYS

FIG. 4
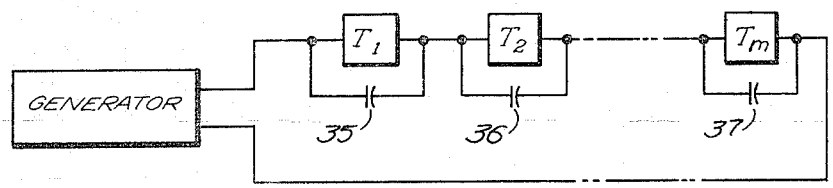
VARIABLE RELUCTANCE TRANSDUCER
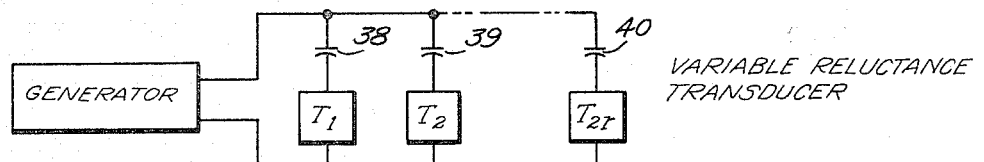
VARIABLE RELUCTANCE TRANSDUCER
FIG. 5
FIG. 6
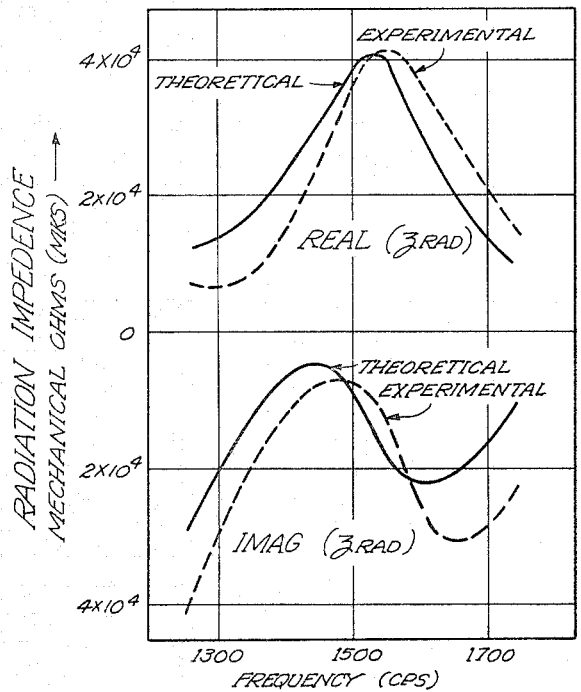
INVENTORS
JOHN S. HICKMAN
GORDON E. MARTIN
BY
ATTORNEYS 3,303,688
TRANSDUCER TEST EQUIPMENT AND METHOD
John S. Hickman, San Diego, Calif., and Gordon E. Martin, Austin, Tex., assignors to the United States of America as represented by the Secretary of the Navy
Filed Mar. 9, 1965, Ser. No. 438,431
6 Claims. (Cl. 73—1)

The invention described herein may be manufactured and used by or for the Government of the United States of America for governmental purposes without the payment of any royalties thereon or therefor.

This invention relates to means and methods of testing transducers and is particularly directed to means and methods of creating in the laboratory the mechanical impedance at the face of a transducer which is equal to the radiation impedance seen in an array.

Transmitting transducer elements for ensonifying the sea with reasonable amounts of acoustic energy are quite large, very heavy, and always expensive. After manufacture, the individual elements, or arrays of the elements, must be lowered by derrick into the water for testing. Electric power fed through waterproof cables into the transducer can be measured, but accurate determination of the acoustic output is difficult and expensive. Determinations of such characteristics as directional patterns, and phase relations of input and output waves leave much to be desired, largely because of the unfriendly environment in which the testing must be done. The difficulties of testing are compounded when large arrays of transducers must be assembled and lowered into the water. Then, chaos can ensue.

When transducer elements are designed for use in an array a specific face velocity distribution is assumed. For example, it is assumed all velocities are identical in amplitude and phase when all input currents are identical or when all input voltages are identical. Unfortunately, actual performance heretofore, often bore little resemblance to design predications, because, it has been reliably determined, the basic assumptions are in error and the erratic behavior of the array is caused by the many acoustic couplings of each element with all the other elements of the array.

Accordingly, the general object of this invention is to provide improved means and methods of testing transducers.

A more specific object of this invention is to provide means for creating specified measurable radiation impedances for transducers.

A still more specific object of this invention is to provide means for creating, in the laboratory, the radiation impedance of a transducer corresponding to the radiation impedance of a transducer element located in any position in an array.

The objects of this invention are attained by stiffly coupling the radiating face of the transducer under test to a mechanical load. The load comprises a second or load transducer for converting the mechanical energy at the face to electrical energy at electrical terminals of the load transducer. A signal source of the desired frequency is connected to the electrical terminals of the test transducer and a complex load, including resistance and reactance, is connected to the electrical terminals of the load transducer. The real and imaginary components of the load may be so selected as to present to the face of the test transducer the complex radiation impedance that would be encountered at any location in a submerged array.

Other objects and features of this invention will become apparent to those skilled in the art by referring to the preferred embodiments described in the following specification and shown in the accompanying drawing in which.

Figure 3:
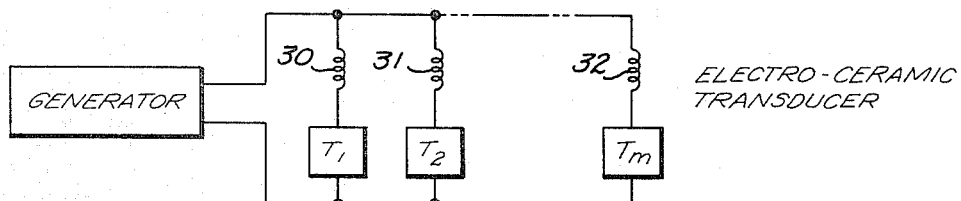

FIGS. 3, 4, and 5 are circuit diagrams of one array of transducers coupled according to the predictions of the test equipment of this invention; and FIG. 6 shows a graph of the functional relation of frequency and complex mechanical impedance of one transducer tested according to this invention.

Figure 1:
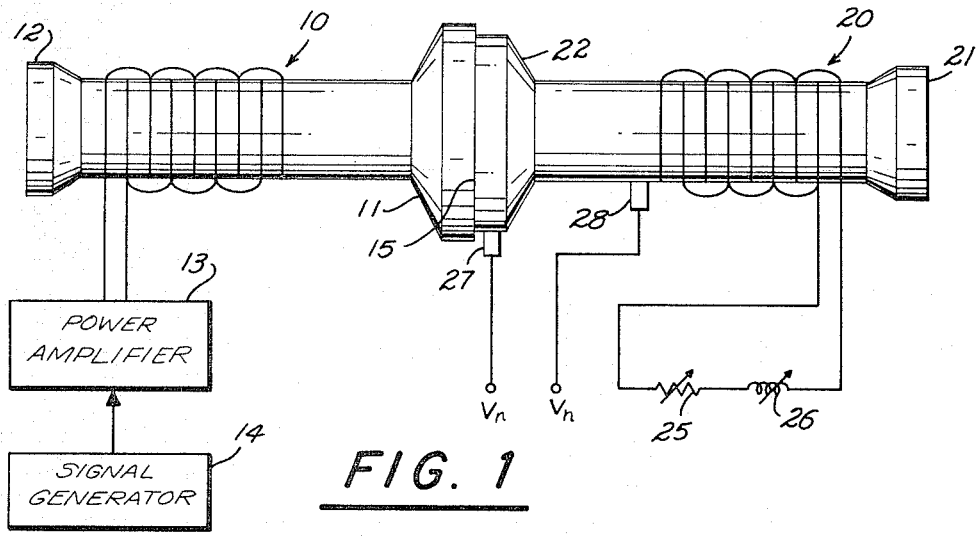
FIG. 1 is a diagrammatic elevational view of a transducer under test and the equipment for testing the transducer.

While the transducer to be tested may be of any type, the particular transducer 10 shown in FIG. 1, is of the electro-ceramic type having a coaxial series of rings of electrostrictive material, such as barium titanate. Alternate electrodes of the rings are connected together and hence to one side of the power amplifier 13, while the remaining electrodes are connected together and to the other side of the amplifier. The amplifier is driven by the signal generator 14 having adjustable frequency. One end of the ceramic stack is connected to the tail piece mass 12 while the other end of the stack is connected to the head piece 11, the face 15 of which oscillates in response to the signal applied. Alternatively, the transducer may be of the electromagnetic type in which the ceramics are replaced by the variable reluctance vibrating motor of conventional design. The reactance of the input circuit of the electro-ceramic transducer is essentially capacitive while the input reactance of the electromagnetic transducer is essentially inductive.

The principal problem of testing a transducer in a laboratory is that of simulating the operating under-water environment of the transducer. This problem is particularly complex when the transducer is designed to serve as one of many identical elements assembled in a large array with each radiating surface small compared to a wavelength to be radiated. The acoustic coupling between elements in water is high and is such that the operating environment of each element depends upon its location in the array. According to this invention, a different radiation impedance is presented to the radiating surface of the test transducer for each different location in the array. The mathematical problem of computing the radiation impedance of any particular transducer resides primarily in summing all of the forces acting on the one radiating surface from each of the other surfaces, taking into account the phase relationships of the coupling forces. The mathematics of these summations is complex and is beyond the scope of this disclosure, although it is comparatively simple with a properly programmed computer to predict the radiation impedance for each of the elements of the array. According to this invention these underwater radiation impedances are achieved on the bench by stiffly coupling a second transducer or load, hereinafter sometimes called the dummy transducer, to the face of the test transducer.

The dummy transducer is shown at 20 in FIG. 1 and comprises the tail piece 21 and the head piece 22. The dummy transducer is of any type, the mechanical-to-electrical transfer characteristics of which are known. This dummy transducer is not electrically driven but instead its electrical terminals are connected across the resistance 25 and reactance 26. The sign of the reactance is usually opposite the sign of the reactance of the load being tested. When the transducer is of the electro-ceramic type, and is capacitive the reactance is inductive, L, as shown. If the transducer under test is inductive, element 26 would be capacitive. By varying this resistance and reactance the entire range of complex radiation impedances desired at the face 15 of the test transducer may be achieved.

The dummy transducer 20 converts the mechanical energy from the test transducer into electrical energy and the resistance of the terminating load dissipates this energy. In this way mechanical energy is absorbed which is to say radiation resistance has been provided. At the same time the effective mass and stiffness of the dummy transducer with is electrical termination simulate these characteristics as they would occur at the transducer face in the array. Thus, radiation reactance is provided in the laboratory. Appropriate values of resistance R and inductance L terminating the dummy transducer simultaneously achieve the desired radiation resistance and the desired radiation reactance.

In practice, these values of resistance R and inductance L are first determined by calculating, with the aid of the computer, the electrical impedance looking into the dummy transducer when the radiation impedance looking out of its face is the negative of the desired radiation impedance. If the negative of that input electrical impedance is connected across the electrical terminals of the dummy transducer, then the radiation impedance looking into the face of the dummy has the required value. Sets of values of resistance and inductance are preferably determined in order to produce a set of radiation impedances, throughout a desired frequency range, at the face of the test transducer.

Figure 2:
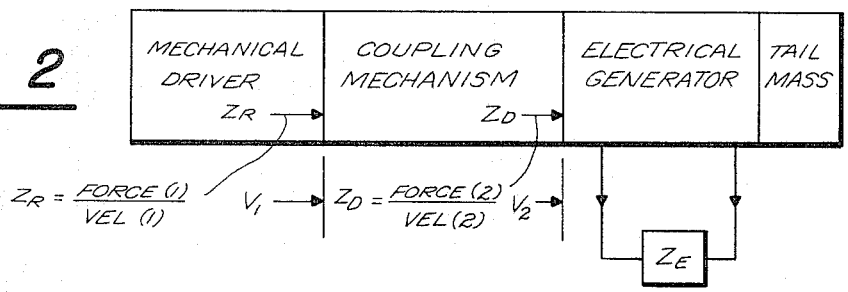
FIG. 2 is a mechanical analog of the principal parts of the load transducer of this invention.

As shown in FIG. 2, the load transducer comprises a coupling mechanism between the active electric generator and the energy to be absorbed. The coupling mechanism is designed and built so that its own mechanical impedance is easily calculated. The mechanism may, for example, comprise a simple mass and a simple tube, or neck, as shown. By knowing the mechanical impedance and the complex ratio of the velocities at both ends of the mechanism, the mechanical impedance at either end of the mechanism can be determined. Mechanical impedance is the ratio of force and velocity for one dimensional force and velocity along the axis of the transducer.

Since the forces, $F_1$ and $F_2$, and velocities, $V_1$ and $V_2$, on the two ends of the coupling mechanism are linearly related, a matrix equation can be written thus:

$$\begin{pmatrix} F_1 \\ F_2 \end{pmatrix} \begin{pmatrix} Z_{11} Z_{12} \\ Z_{21} Z_{22} \end{pmatrix} \begin{pmatrix} V_1 \\ V_2 \end{pmatrix} \quad (1)$$

where the elements of the Z matrix depend on the known mechanical properties of the coupling mechanism. Then by dividing by $V_1$, it is found that $$Z_R = \frac{F_1}{V_1} = Z_{11} + Z_{12} \frac{V_2}{V_1} \quad (2)$$

Thus, $Z_R$ can be determined from the known mechanical characteristics of the coupling mechanism and by the velocities which can be easily measured. For example, accelerometers 27 and 28, FIG. 1, can be attached to the ends of the coupling mechanism to read out the velocities.

The method for determining accurately the proper radiation impedances of each transducer of an array in the laboratory involves first the step of approximating the radiation impedances of each transducer of the array. Then, from the impedances of the appropriate electrical terminations of the dummy transducer are calculated. Finally, the exact electrical termination is established by direct measurement of the radiation loads achieved. Experience has shown that the agreement between predicted and measured radiation impedances is quite good, particularly as to trends. Preferably the mechanical impedance is plotted against frequency throughout the range of frequencies to be employed. Conveniently, the real portions of the radiation impedance is plotted on the same graph as the imaginary portions of the radiation impedance, as shown by way of example in FIG. 6.

There are a wide range of experiments made possible by the development of array type radiation impedances in the laboratory. Electro-mechanical efficiency, input impedance, rate of change of temperature per volt drive and head velocity per volt drive have all been measured on a single transducer element operating as though it were on the corner of a big array, in the center of a big array or in an intermediate position. All measurements can be made without building a large array.

An important anticipated use of the test equipment of this invention is the further refinement of velocity control techniques for large arrays to obviate the erratic performance of the arrays. The required conditions for smooth array performance are that the magnitude and phase of the velocity of the radiating faces be made to depend upon a drive voltage alone, or a drive current alone, and be independent of the radiating impedance. A device, somewhat like a tuner, for each transducer is contemplated. If the transducers are capacitive in nature as in the case of electroceramic elements, the inductances 30, 31 . . . 32 are individually connected in series with the transducers as shown in FIG. 3. If, however, the transducers of the array are of the variable reluctance type as shown in FIG. 4 where the input impedance is inductive the parallel capacities 35, 36 . . . 37 are connected across individual transducers, or in series with the individual transducers as shown in FIG. 5. The effectiveness of the series inductances or the shunt or series capacitances, as shown in FIGS. 3, 4 and 5, can readily be checked at each of several frequencies by simply varying the electrical impedance terminating the dummy transducer and observing the head velocity.

The cost advantage of bench testing transducers according to this invention compared to under-water testing is obvious. Bench tests precisely predict the performance of any element at any point in an array before the array is built. This obviates the danger of destruction or damage to transducer elements caused by the erratic feedback phenomena among transducers of the array.

Many modifications and variations of the present invention are possible in the light of the above teachings. It is therefore to be understood that within the scope of the appended claims the invention may be practiced otherwise than as specifically described.

What is claimed is:

1. The method of testing a transducer having a radiating face and means for oscillating that face in response to energy waves fed to the transducer, said method comprising;

tightly coupling the face of a second transducer to the face of the test transducer, coupling a variable resistive and reactive load to the terminals of said second transducer, feeding power to the test transducer, and observing the velocity of said face while energy is passing through the coupled transducers.

2. Means for measuring the radiation impedance of a tranducer comprising;

a dummy transducer having an energy receiving face, a mechanical-to-electrical energy converter with electrical terminals, and a coupling mechanism of predetermined mechanical impedance for coupling energy at said face to said converter, means for providing good acoustic contact between the two transducer faces, a reactive load coupled to the terminals of said dummy transducer, and a signal source coupled to the terminals of the transducer under test, and means for measuring the velocity of the interface of said transducers.

3. The method of measuring the radiation impedance of a transducer corresponding to the submerged radiation impedance of the transducer at a predetermined position in an array, said methods comprising;

coupling in air the radiating face of the transducer under test to the face of a dummy transducer, feeding electric energy into the terminals of said transducer under test, absorbing said energy in a reactive load circuit connected to the terminals of said dummy transducer, adjusting the resistance and the reactance of said load circuit to correspond with the real and imaginary components of said submerged radiation impedance, and observing the velocity of the radiating face of said transducer.

4. A system for testing an oscillatory mechanical energy source working into different complex mechanical impedances of said system comprising;
- a mechanical-to-electrical energy converter having a power-handling capacity comparable to the magnitude of the energy of said source,
- a coupling mechanism of predetermined mechanical impedance for feeding said energy so said converter, and
- an adjustable resistive and reactive electrical load connected to the terminals of said converter for adjusting the mechanical load presented to said source, the resistance of said load being capable of dissipating the energy of said source and the reactance of said load being opposite the sign of the active component of said source.

5. In the system defined in claim 4, said load comprising resistances and inductane connected in series across the terminals of said energy converter.

6. The system defined in claim 4 further comprising first and second means, respectively, for measuring the velocity at opposite ends of said coupling mechanism.

References Cited by the Examiner

UNITED STATES PATENTS 3,191,431  6/1965  Schloss _____ 73—67.1

OTHER REFERENCES

Kaufman et al.: Instruments and Automation, September 1955, volume 28, pp. 1510–12.

Lewis: Instrument Practice, April 1959, pp. 405–410.

References Cited by the Applicant

UNITED STATES PATENTS 2,572,667  10/1951  Ruggles.
2,754,238  7/1956  Arenberg.
2,918,651  12/1959  Podolak et al.

LOUIS R. PRINCE, *Primary Examiner.*

S. C. SWISHER, *Assistant Examiner.*